3,692,705
EPOXY PHTHALIMIDE RESINS
Herbert A. Newey, Lafayette, and Howard V. Holler, Oakland, Calif., assignors to Shell Oil Company, New York, N.Y.
No Drawing. Filed Sept. 24, 1970, Ser. No. 75,254
Int. Cl. C08g 30/00
U.S. Cl. 260—2 EP                 10 Claims

ABSTRACT OF THE DISCLOSURE

Novel epoxide-containing phthalimide resins are described having at least two epoxy groups per molecule, at least one of which is a glycidyl group attached to the nitrogen atom of a phthalimide structure or hydrogenated phthalimide structure. These resins may be cured with conventional epoxy curing agents to produce hard, flexible insoluble compositions.

BACKGROUND OF THE INVENTION

This invention is concerned with epoxy-containing resins. More particularly, it is directed to new and valuable epoxy resins that have phthalimide units as part of their structure. It is also concerned with the preparation of such resins and polymers made therefrom by contacting the resins with epoxy curing agents.

There is a constant need to develop thermosetting resins that retain their mechanical properties in more demanding environments. Cured resins that have better resistance to temperatures above 200° C. without distortion, or cured resins that have higher modulus and are therefore stiffer in extension or flexure offer wider scope in new products to the designer and manufacturer. Many commercial products today do not meet stringent demands for more rigid or more temperature resistant properties.

Cured epoxy resins meet the needs for thermosetting resins in many industrial applications. Epoxy resins made from Bisphenol A (2,2-bis(4-hydroxyphenyl) propane) and epichlorohydrin are widely used in various physical forms, molecular weights and degrees of purity. Other epoxy resins made by reacting epichlorohydrin with phenols, amines, cyanurates, melamines, disiloxanes and other compounds and by reacting peracetic acid or hypochlorous acid with compounds containing olefinic unsaturation are described in Lee and Neville's Handbook of Epoxy Resins and elsewhere.

The epoxy resins of commerce are usually liquid or low melting resins that form low-viscosity, easy to process systems. They have a unique combination of properties, including easy cure at temperatures from room temperature to 150° C. depending on the curing agent, low shrinkage, high adhesive strength, excellent mechanical properties, high electrical insulation characteristics, good chemical resistance, and versatility achievable by blending of resin types, by selection of curing agents and by use of modifiers and fillers.

Solid epoxy resins are used in solution as coatings, both with and without prior reaction with drying oils, wherein the epoxy resin imparts toughness, scuff resistance and chemical resistance. The epoxy resins find their main applications in adhesives, as in the aircraft industry, in body solder and caulking compounds, in castings to make molds, dies and patterns, in special road surfaces, in potting and encapsulation compounds and in laminating resins for airframes and missile applications.

In many of these applications, commercial epoxy resins are used, but epoxy resins of superior properties such as higher stiffness and higher heat distortion temperature would be welcomed. In the voluminous literature many new catalysts have been tried in commercial epoxy resins, with some success in improving properties, including heat resistance, but the limitations of this approach are now evident.

In general, the means of preparing and evaluating epoxy resins are well known and are well described in Lee and Neville's handbook. Success in achieving better resin properties lies in the choice of particular novel chemical structures, which are then epoxidized by known means. We have discovered that epoxy phthalimide structures have intrinsically better properties in some respects than conventional commercial epoxy resins.

OBJECTS OF THE INVENTION

It is the object of the present invention to provide a new class of epoxy resins. Another object of this invention is to provide new resins containing epoxy and phthalimide structures. It is a further object of this invention to provide epoxy and phthalimide-containing resins that can be cured to yield products of improved rigidity and improved resistance to heat distortion. These and other objects of the invention will become apparent during the following detailed description of the invention.

DESCRIPTION OF THE PREFERRED EMBODIMENT

Now, in accordance with this invention, epoxide-containing phthalimide resins are provided having at least two epoxy groups per molecule, at least one of which is a glycidyl group or an alkyl-glycidyl group attached to the nitrogen atom of a phthalimide structure or hydrogenated phthalimide structure. This new series of epoxy resins provides an unexpected combination of properties, making the resins suited for important applications, particularly those requiring resistance to deformation in hot environments and/or greater rigidity.

The new resins of this invention comprise those organic materials that have more than one vic-epoxy group, i.e., more than one

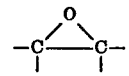

group, which may be in a terminal position, i.e., a

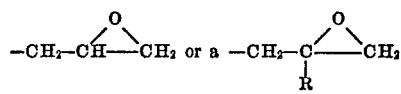

group, wherein R is an alkyl radical of preferably up to 10 carbon atoms such as methyl, etc., or in an internal position, i.e., a

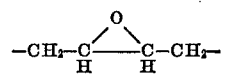

group, as well as having one or more phthalimide structures, i.e.,

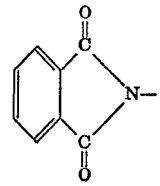

or hydrogenated phthalimide structures, i.e.,

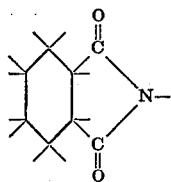

in each molecule.

The new resins have the generalized formula

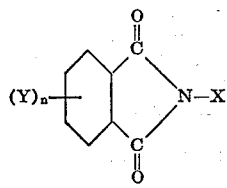

in which the six membered ring is a benzene or hydrogenated benzene ring, (i.e., a phthalimide or hydrogenated phthalimide structure) and X is a

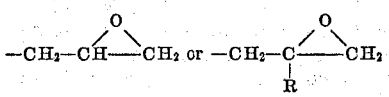

group, wherein R is an alkyl of 1 to 10 carbon atoms. The structural feature Y in this formula can take many forms, such as $—(CH_2)_mX$ or $$CH_3—(CH_2)_m—X—(CH_2)_m—$$

(where $m$ is an integer from 0 to 18, preferably 0 to 8), or

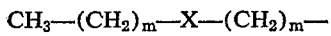

or O—X, or N—X, or the oxygen atom of an oxirane ring of which the two carbon atoms are also part of the alicyclic ring, or an epoxidized ring structure attached to the ring. C, N and O are carbon, nitrogen and oxygen atoms.

Examples of such polyepoxides include, among others, N-glycidyl-4,5-epoxycyclohexane-1,2-dicarboxylimide, N-glycidyl-4-carboglycidoxyphthalimide, N,N,N'-triglycidyl-4-aminophthalimide, bis(4-N-glycidylphthalimide)ketone, N,N' - diglycidylpyromellitic diimide, N,N'-di(2-methylglycidyl)pyromellitic diimide, N,N'-diglycidyl1-6,7-imidonaphthalimide and resins containing saturated rings, such as N,N' - diglycidyl-4-glycidoxycyclohexane-1,2-dicarboxylimide.

Other examples of suitable polyepoxyphthalimide resins are N-glycidyl-4-glycidoxyphthalimide, bis(4-N-glycidylphthalimido)methane, 1,4-diglycidoxy-N-glycidylphthalimide, N-glycidyl-4-(2,3-epoxybutyl)phthalimide, and the like, and ring hydrogenated analogs thereof.

A small group of epoxyphthalimide resins of particular interest are those of the multiring naphthalimide type. These are exemplified by N-4-diglycidylnaphthalene dicarboxylimide, N,N'-diglycidyl-1,4,5,8-naphthalene tetracarboxyldimide and the like.

A preferred group of the above described polyepoxy phthalimides are those having glycidoxy, N-glycidyl and carboglycidoxy groups as well as the required N-glycidyl phthalimide structure groups. These may be prepared by reacting the required proportions of hydroxyphthalimide, carboxyphthalimide or aminophthalimide with excess epichlorohydrin in an alkaline medium. The desired alkalinity is obtained by adding basic substances such as sodium or potassium hydroxide, preferably in stoichiometric excess to the epichlorohydrin. The reaction is preferably carried out at temperatures within the range of 50° C. to 150° C. Heating is continued for several hours to complete the reaction, and the product is then washed free of salt and base.

Alternatively, carboxylic acid and imide groups may be converted to their alkali metal salts, and the metal salt is then reacted with excess epichlorohydrin in the presence of a few percent of a catalyst such as tetramethylammonium bromide to yield the diglycidyl resin.

Alternatively, aminophthalimides may be used to form resins within the scope of the present invention by reacting them with epichlorohydrin in the presence of acetic acid and tetramethylammonium bromide catalysts to produce polychlorohydrins, which are then converted to the desired polyglycidyl (polyepoxy) resins by dehydrochlorination with powdered alkali metal hydroxide.

Still other types of epoxy phthalimides may be produced by methods known in the art. A phthalimide or tetrahydrophthalimide compound containing one or more olefinic or cycloolefinic carbon-carbon double bonds may be treated with peroxy acids, such as peracetic acid, or inorganic peracids or by other oxidative means, to form epoxy groups.

The finished resins produced by the above-mentioned methods will vary from soft to brittle solids or may be crystalline solids. The product of this invention are soluble in solvents such as acetone, toluene, benzene and the like. They are, generally, not heat curable; that is, they cannot be converted to the insoluble, infusible stage by heat alone.

Epoxy-containing condensates may be prepared from the resins of this invention, if desired, by reacting the resins with polybasic acids in the presence of catalysts such as tertiary amines, tertiary amine borates, quaternary ammonium salts or organic phosphines. In order to avoid making insoluble infusible products in this reaction, it is essential that the acidic component be reacted with at least 1.5 times the chemical equivalent of the polyepoxide resin; this is the amount needed to furnish at least 1.5 epoxy groups for every acidic group. Preferably, the ratio of epoxy to acid equivalent should be 2:1 or even 4:1. Examples of catalysts for this reaction are triethylamine, pyridine, dimethyl benzylamine and the like, or the methyl borate or trimethyl borate derivatives, or trimethyl ammonium salts of inorganic acids, or triphenyl phosphine, tributylphosphine and the like. Examples of suitable polybasic acids are polymeric acids, such as dimer and trimer acids from ethylenically unsaturated fatty acids and the hydrogenated dimer and trimer acids.

Temperatures for this condensation reaction will generally be 50° C. to 150° C. The reaction may be conducted in the absence of solvent, or, if needed because the resin and polybasic acid are both solids, a solvent such as an inert hydrocarbon like benzene, toluene or cyclohexane or other materials like cyclohexanone and the like may be used. The solvent may be retained in the condensate or vacuum distilled or some other suitable method may be used to remove it. The catalyst also may be removed, if necessary, by stripping, neutralization or the like.

The condensates made from the epoxy phthalimides of this invention are valuable in the preparation of surface coating compositions. In this application the condensate is usually mixed with a diluent such as a ketone, ester, ether-alcohol, chlorinated hydrocarbon or hydrocarbon, or mixtures thereof, to achieve a viscosity suitable for spraying, brushing or dipping. The necessary curing agent may be added alone or as a solution in a suitable solvent. Satisfactory cures of the coatings are generally obtained at temperatures of 60° C. up to 200° C. The coatings compositions may contain dyes, pigments, stabilizers, plasticizers, and bodying agents, if desired.

The epoxy groups in the polyepoxy phthalimide resins or in the condensates described above may be cured by reaction with typical epoxy curing agents to form insoluble, infusible products. For this purpose, epoxy curing agents that are acidic, neutral or alkaline may be added.

Examples of the curing agents for the epoxy phthalimide resins and their condensates include, among others, alkalies like sodium or potasium hydroxides; alkali phenoxide like sodium phenoxide; carboxylic acids or anhydrides, such as oxalic acid or phthalic anhydride; dimer or trimer acids derived from unsaturated fatty acids, 1,20-eicosanedioic acid, and the like; Friedel-Crafts metal halides like aluminum chloride, zinc chloride, ferric chloride or boron trifluoride as well as complexes thereof with ethers; acid anhydrides, ketones, diazonium salts, etc.; salts, such as zinc fluoborate, magnesium perchlorate and zinc fluosilicate; phosphoric acid and partial esters thereof, including n-butyl orthophosphate, diethyl orthophosphate, hexaethyl tetraphosphate.

Amino compounds are especially useful as curing agents. Examples are diethylenetriamine, triethylenetetramine, dicyandiamide, melamine, pyridine, cyclohexylamine, benzyldimethylamine, benzylamine, diethylaniline, triethanolamine, piperidine, N,N-diethyl-1,3-propanediamine, 1,2-diamino-2-methylpropane, 2,3-diamino-2-methylbutane, 2,4-diamino - 2 - methylpentane, 2,4-diamino-2,6-dimethyloctane, dibutylamine, dinonylamine, distearylamine, diallylamine, dicyclohexylamine, ethylcyclohexylamine, o-tolylnaphthylamine, pyrrolidine, 2-methylpyrrolidone, 2-methylpiperidine, 2,6-dimethylpiperidine, diaminopyridine, metaphenylene diamine, and the like; and soluble adducts of amines and polyepoxides and their salts, such as described in U.S. 2,651,589 and U.S. 2,640,037.

Salts of imidazole compounds are also excellent curing agents for the polyepoxy phthalimides of this invention and for the condensates made from them. Examples of suitable imidazole salts include, among others, the acetate, formate, lactate and phosphate salts of imidazole, benzimidazole and substituted imidazoles. Examples of suitable substituted imidazoles include 2-methylimidazole; 2-ethyl-4-methylimidazole; 2-cyclohexyl-4-methylimidazole; 4-butyl-ethylimidazole; 2-butoxy-4-allylimidazole; 2-carboethoxybutyl-4-methylimidazole; 2-octyl-4-hexylimidazole; 2-methyl-5-ethylimidazole; 2-ethyl-4-phenylimidazole; 2-amino-5-ethylimidazole; 2-ethyl-4-(2-ethylamino) - imidazole; 2-methyl-4-mercaptoethylimidazole; 2-butylacetate-5-methylimidazole; 2,5-chloro-4-ethylimidazole; and mixtures thereof. Especially preferred are the alkyl-substituted imidazole acetates and lactates wherein the alkyl groups contain not more than 8 carbon atoms each, or mixtures thereof, and particularly preferred are 2-ethyl-4-methylimidazole acetate, 2-ethyl-4-methylimidazole lactate, 2-methylimidazole acetate, 2-methyl-imidazole lactate, imidazole acetate, imidazole lactate, and mixtures thereof.

These imidazole salts can be prepared by reacting the imidazole with the acid to form the corresponding amine salt. The components are mixed and heated to 25–150° C. in a solvent, if desired. The acid required for these salts may be, in general, any fatty acid or organic dibasic acid. Preferred imidazole salts are imidazole adipate, imidazole phthalate monohydrate, imidazole acetate, imidazole lactate and salts of substituted imidazoles with these same acid radicals.

Mixtures of members of these groups of curing agents may be used when desired. For example, a phosphine and an imidazole salt may be used together as a curing agent, or a combination of a phosphonium halide and an amine, or other combinations and mixtures may be employed, where appropriate, to achieve particular objectives.

Other preferred curing agents are the polycarboxylic acids and acid anhydrides, the primary and second aliphatic, cycloaliphatic and aromatic amines and adducts of these amines and polyepoxides. In addition, urea-formaldehyde, melamine-formaldehyde and phenol-formaldehyde resins can also be used to cure the compositions of the invention, particularly when baked coatings are desired.

Particularly preferred curing agents are the phenylenediamines, i.e., ortho, meta and paradiaminobenzene, and particularly metaphenylenediamine. These polyamines yield cured products of very good strength, as well as the improve modulii and resistance to heat distortion that are characteristic of the polyepoxy phthalimide resins.

The amount of curing agent to be used will vary widely, depending on the particular resin and the particular curing agent selected. In general, the amount of curing agent will range from about 1% to about 200% by weight of the polyepoxy phthalimide resin. The polyamine curing agents are preferably employed in amounts from 0.5% w. to 50% w. In the case of metaphenylenediamine, where there is a specific reaction with epoxide groups, stoichiometric amounts should be used for best results; that is, the quantity or metaphenylenediamine used should correspond to one amine hydrogen for each epoxy group, so that the amount of amine used will depend on the number of epoxy groups per molecule and the total molecular weight of the resin.

Activators for the curing agents, often referred to as accelerators or catalysts, are also useful in forming three dimensional polymers from the resins of this invention. These compounds may be added in addition to curing agents described above. The activators may be added in relatively small amounts, preferably 0.1–2% w., compared to the main curing agent, to increase the rate and/or lower the temperature at which curing occurs. Particularly useful activators for curing the products of this invention are stannous salts of monobasic acids, such as stannous octoate and the like; imidazole salts, such as imidazole lactate and the like; lithium salts, for example lithium benzoate; tertiary amines and tertiary amine borates.

The resins of this invention are particularly useful and valuable when cured to insoluble, infusible plastics. A typical but not limiting method by which such plastics may be obtained is to produce castings by heating the polyepoxy phthalimide resins and the curing agent separately to about 80° C., then combining them and mixing them thoroughly with a mechanical stirrer while maintaining the temperature at about 80° C. The warm mixture is degassed in a vacuum oven at low pressure, for example, 5 mm. Hg absolute pressure, and then poured into a suitable mold. The temperature of the resin-curing agent mixture in the mold is held at 80–85° C. until gelation occurs, after which the temperature is raised to about 160° C. for 1–10 hours, preferably 4–6 hours. After cooling slowly to room temperature, the bubble free castings are removed from the mold.

Another important application of the products of this invention is in the preparation of laminates or resinous articles reinforced with fibrous materials. Although it is generally preferred to utilize glass cloth for this purpose, any of the other suitable fibrous materials in sheet form may be employed, such as glass matting, paper, asbestos paper, mica flakes, cotton batts, duck muslin, canvas and the like.

In preparing the laminates "wet lay-up" procedures may be used, or other techniques known to the art may be employed depending on the end use and properties desired. In one method the plies of fabric are stacked with warp threads parallel. Warp and filling threads should be nested, that is, each ply should be laid in a face to face, back to back relationship to adjacent plies. After the fabric has been dried for 30 minutes at 200° C. in a forced draft oven, it is placed on a piece of 500 PT cellophane one ply at a time with a small amount of resin between each ply. Another piece of cellophane is placed on top of this stock and the entrapped air is removed. The entire lay-up, with cellophane, is then cured between 18 gage stainless steel plates in a steam heated hydraulic press. The preferred glass cloth types are Volan A treated S glass cloth and HTS 181 treated S glass cloth. The void content of the laminate should be kept low, less than 5% and preferably less than 1% volume.

Alternatively, the laminates may be made by impregnating the cloth with a solution of resin and curing agent in a volatile solvent, for example, acetone. The sheets of fibrous material or cloth are impregnated by spreading the resin solution on them, or by dripping or otherwise immersing them in an impregnant. The solvent is conveniently removed by evaporation and the mixture is cured by heating as noted above.

Another important use of the compositions of this invention is in the production of molded articles. A partially cured molding composition is first prepared by milling together a mixture of resin and curing agent with the customary fillers and mold release agents. Usually the milled mixture is set up so that fusible resin is obtained first. The milled mixture is cooled and then ground up; molded articles are made therefrom by conversion of the fusible resin to the infusible state using molding machines, such as those for compression or transfer molding. If desired, the fusible, milled mixture may be prepared in preformed pellets and the like.

The following examples illustrate the manner in which the invention may be carried out. The examples are for the purposes of illustration, and the invention is not to be regarded as limited to any of the specific compounds or conditions recited. Unless otherwise specified, parts disclosed in the examples are parts by weight.

EXAMPLE I

This example illustrates the improved properties obtained when a polyepoxy phthalimide resin is mixed with metaphenylenediamine and cured as a cast sheet.

N-glycidyltetrahydrophthalimide was prepared by reacting tetrahydrophthalimide with epichlorohydrin by means well known to the art. The product of the reaction was epoxidized by dissolving 410 g. (1.98 moles) of it in 2.2 liters of chloroform in a three-liter flask. During a 35-minute period, 403 g. (2.18 moles) of 41.2% peracetic acid, buffered with 7 g. of sodium acetate, was added at 21–25° C. Reaction continued at room temperature for 5 hours. After washing the chloroform solution with $NaHCO_3$ solution, then with dilute HCl, and drying over solid $MgSO_4$, the chloroform was removed by distillation. The 331 g. of solid was recrystallized from methanol to yield 252 g. of white crystalline product melting at 85–87° C. The epoxide value of this product was 0.882 eq./100 g. (97.6% of theory).

One hundred parts of epoxidized N-glycidyltetrahydrophthalimide resin of 98% purity (as determined by epoxy analyses) was heated to 80° C. and was thoroughly mixed using mechanical stirring with 23 parts of purified metaphenylenediamine and 0.25 part of stannous octoate (a curing accelerator) also heated to 80° C. This is the stoichiometric quantity of catalyst, providing one amine hydrogen for each epoxide group. During the 5 minutes mixing period, the temperature was held to 80–85° C. The warm mixture was degassed for 5–10 minutes at an absolute pressure of 5 mm. Hg, then poured into a glass mold warmed to 80° C. The mold consisted of two 11 inch by 13 inch Herculite glass plates pretreated with mold release agent. The plates were held face to face with C clamps, but separated by ⅛ inch brass spacers, and ³⁄₁₆″ thick natural gum rubber tubing was placed between the plates to form a long U-shaped dam.

The filled mold was placed in an oven at 80° for 120 minutes until the resin system gelled, and was then transferred to an oven at 160° C. for six hours. The cured, bubble-free casting was then allowed to cool slowly at room temperature.

Test specimens were cut from the cast sheets using an 8000 r.p.m. water-cooled Allison carborundum wheel. Tensile specimens were shaped on a Tensilkut machine. Compressive test rods were cast inside ½ inch inside diameter aluminum tubing.

Test methods used are described below. All tests were made on a large, floor model Instron tester at 23° C. and 50% R.H.

(1) Heat distortion temperature was measured on ⅛ inch thick specimens at 264 p.s.i. fiber stress, using ASTM method D–648–56.

(2) Flexural strength was determined by ASTM method D–790–59T on specimens 4.0 inches long and 0.125 inch thick, at a span of 2 inches and at 0.05 inch per minute crosshead speed of the Instron Tester.

(3) Compressive strength was measured using ASTM method D–695–54, using as specimens rods 0.5 inch in diameter and 1.5 inches long, with ends smooth and perpendicular to the long axis of the specimen and at 0.05 inch/minute crosshead speed of the test instrument.

(4) Tensile strength was determined as a ten specimen average by ASTM Test D–638–68T, using Type I specimens having dimensions 8½ inches long, 0.750 inch wide and 0.125 inch thick, and conforming to ASTM requirements in other respects. Gage length during the test was 2.00 inches and the distance between grips was 4½ inches. Tensile elongations were measured using a 0.5 Peters model S–6M–644 microformer extensometer (100/1 magnification).

A comparison of mechanical properties of the cured polyepoxyphthalimide and a cured commercial epoxy resin (diglycidyl ether of 2,2-bis(4-hydroxyphenyl)propane) of molecular weight 350 and epoxy equivalent 170–200.

|  | Epoxidized N-glycidyl tetrahydrophthalimide | Commercial epoxy resin, diglycidyl ether of Bisphenol A |  |
|---|---|---|---|
| Resin purity, percent | 96 | 98 | 92 |
| Curing agent, phr.[a] | 23.3 | 15.6 | 14.6 |
| Heat distortion temp., ° C | 222 | 178 | 150 |
| Density | 1.36 | 1.21 | 1.21 |
| Tensile properties, 23° C.: |  |  |  |
| Break, p.s.i | 10,700 | 12,300 | [b] 12,890 |
| Modulus, p.s.i.×10⁻⁵ | 8.8 | 4.2 | [c] 4.62 |
| Elongation at break | 1.8 | 6.3 | [d] 6.5 |
| Flexural properties, 23° C.: |  |  |  |
| Ultimate strength, p.s.i | 17,900 | 20,300 | 20,500 |
| Modulus, p.s.i.×10⁻⁵ | 7.3 | 4.6 | 4.7 |
| Compressive properties, 23° C.: |  |  |  |
| Yield, p.s.i | 34,100 | 18,900 | 18,600 |
| Break, p.s.i |  | 21,600 | 20,500 |
| Izod impact strength, ft. lbs./ inch notch | 0.35 | 0.51 | 0.67 |

[a] Metaphenylenediamine, 100% stoichiometry.
[b] Standard deviation 243.
[c] Standard deviation 0.29.
[d] Standard deviation 0.96.

From the data above it is clear that cured specimens of epoxidized N-glycidyl tetrahydrophthalimide resin had distinctly higher heat distortion temperature, rigidity (modulus) and compressive yield strength than an equivalent cured commercial epoxy resin. Even when compared to purified diglycidyl Bisphenol A, in which the epoxy value was 98% based on the idealized Bisphenol A/epichlorohydrin resin structure, the cured polyepoxy phthalimide resin had distinctly improved properties.

EXAMPLE II

Using the methods described in Example I, a cured casting is prepared from 100 parts N-glycidyl-4-carboglycidoxyphthalimide resin mixed with 16 parts (100% stoichiometry) of metaphenylenediamine curing agent. This resin was prepared by mixing acetone solutions of equimolar amounts of trimellitic anhydride and anhydrous ammonia to precipitate the corresponding amido carboxylic acids. These were vacuum-baked at 200–220° C. for 24 hours to yield 84% of crude 4-carboxyphthalimide. After recrystallization from isopropanol, the imide was converted to the dipotassium salt using potassium ethoxide in ethanol solution. After stripping off the alcohol by distillation, the salt was refluxed for 2 hours with a 24 molar excess of epichlorohydrin in the presence of 3 mole percent of tetramethylammonium bromide catalyst. The crude product was recrystallized to obtain a crystalline solid having 90% of the expected theoretical epoxide value. Related improvements in properties similar to Example I are obtained in the cured castings.

EXAMPLE III

One hundred parts of epoxidized N-glycidyltetrahydrophthalimide resin is mixed mechanically at 80° C. with 1 part of boron trifluoride etherate and is cured and tested as described in Example I. Related improvements in properties similar to Example I are observed.

EXAMPLE IV

To 100 parts of epoxidized N-glycidyltetrahydrophthalimide resin is added 85 parts of hexahydrophthalic anhydride and 2 parts of 2-ethyl-4-methylimidazole lactate (curing accelerator). After mechanical mixing for a short time at 80° C., the mixture is heated for 2 hours at 90° C. plus 4 hours at 135° C. The product has heat distortion temperature and rigidity similar to Experiment I.

EXAMPLE V

Example I is repeated using 100 parts of epoxidized N-glycidyltetrahydrophthalimide with the exception that the curing agent is replaced with 21 parts of triethylenetetramine. Related results are obtained.

EXAMPLE VI

This example illustrates the preparation of

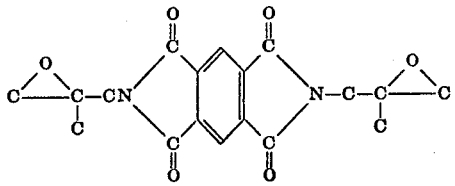

First step: Preparation of N,N'-dimethylpyromelliticdiimide

Reactans:
54 g. pyromellitic dianhydride (0.25 mol)
284 g. methallylamine (4.0 mol)
284 g. water The methallylamine was dissolved in equal weight of water and pyromellitic dianhydride was added slowly with stirring to give a clear solution. This was evaporated to dryness on a steam bath under vacuum. The flask containing the resulting salt was then heated in oil bath while a stream of nitrogen was passed through. The temperature was held at 205–210° C. for 6 hours. The crude brown product was dissolved in 1½ liters of acetic acid near its boiling point. On cooling, the product crystallized out and was dried in a vacuum oven to produce 63 g. of product having the following analysis:

Analysis.—Found: C, 66.5; H, 5.0; N, 8.59. Theory: C, 66.6; H, 4.95; N, 8.65.

A small sample recrystallized from acetic acid and then from chloroform melted at 230–233° C.

Second step

The above product was epoxidized as follows:
50 g. of N,N'-dimethallylpyromellitic diimide (0.154 mol)
63.6 g. of 40.4% peracetic acid (0.339 mol)
900 g. chloroform The N,N'-dimethallylpyromellitic diimide was dissolved in the chloroform and heated to 40° C. At this temperature the peracetic acid was added over a 20-minute period. The reaction mixture was then maintained at 40° C. for 8 hours. (A sample was titrated for peracetic acid every hour and after 8 hours the peracetic acid was no longer disappearing.) The mixture was cooled, washed with water, dilute NaHCO$_3$, and twice more with water. The chloroform was evaporated leaving 43 g. of a white crystalline product, M.P. 217–225° C.

Analysis.—Found: C, 61.8; H, 4.7; E, 0.44. Theory: C, 60.6; H, 4.5; E, 0.56.

We claim as our invention:

1. A compound of the formula:

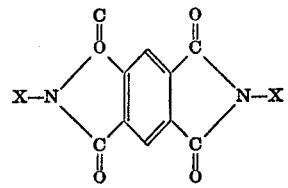

or a compound of the formula

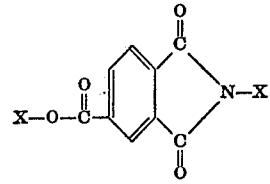

wherein X is a

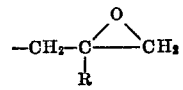

group, in which R is hydrogen or an alkyl of 1 to 10 carbon atoms.

2. A heat curable composition comprising a compound of claim 1 and an epoxy curing agent.
3. A composition as in claim 2 wherein the epoxy curing agent is an amine.
4. A composition as in claim 3 wherein the amine is metaphenylenediamine.
5. A composition as in claim 2 wherein an epoxy curing accelerator is additionally employed.
6. A composition as in claim 5 wherein the accelerator is a stannous salt of a monocarboxylic acid having 5 to 20 carbon atoms.
7. A composition as in claim 6 wherein the accelerator is stannous octoate.
8. The cured composition of claim 2.
9. N-glycidyl-4-carboglycidoxy phthalimide.
10.

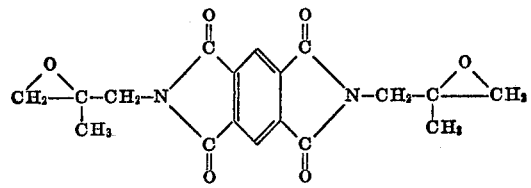

References Cited
UNITED STATES PATENTS

| | | | |
|---|---|---|---|
| 2,999,836 | 9/1961 | Ludwig | 260—42 |
| 3,369,055 | 2/1968 | Salyer et al. | 260—830 |
| 3,455,949 | 7/1969 | Porret et al. | 260—326 |

E. A. NIELSEN, Primary Examiner

U.S. Cl. X.R.

156—330; 260—2 EC, 2 N, 2 EA, 326 C